United States Patent
Ganesan et al.

(10) Patent No.: US 10,860,078 B2
(45) Date of Patent: Dec. 8, 2020

(54) MANAGING POWER REQUEST DURING CLUSTER OPERATIONS

(71) Applicant: DELL PRODUCTS, L.P., Round Rock, TX (US)

(72) Inventors: Vaideeswaran Ganesan, Bangalore (IN); Balamurugan Gnanasambandam, Pondicherry (IN); Tamilarasan Janakiram, Bangalore (IN); Sreeram Muthuraman, Trivandrum (IN)

(73) Assignee: Dell Products, L.P., Round Rock, TX (US)

( * ) Notice: Subject to any disclaimer, the term of this patent is extended or adjusted under 35 U.S.C. 154(b) by 127 days.

(21) Appl. No.: 16/171,240

(22) Filed: Oct. 25, 2018

(65) Prior Publication Data
US 2020/0133369 A1 Apr. 30, 2020

(51) Int. Cl.
*G06F 1/28* (2006.01)
*G06F 9/50* (2006.01)
(Continued)

(52) U.S. Cl.
CPC .............. *G06F 1/28* (2013.01); *G06F 9/4416* (2013.01); *G06F 9/45558* (2013.01); *G06F 9/5088* (2013.01); *G06F 2009/45595* (2013.01)

(58) Field of Classification Search
None
See application file for complete search history.

(56) References Cited

U.S. PATENT DOCUMENTS 7,035,257 B2    4/2006  Vafaei
7,076,645 B2    7/2006  Mittal et al.
(Continued)

FOREIGN PATENT DOCUMENTS

EP    2429123 A4    3/2012

OTHER PUBLICATIONS

International Search Report and Written Opinion, Patent Cooperation Treaty (PCT), International Application No. PCT/US2019/049765, dated Nov. 5, 2019.
(Continued)

*Primary Examiner* — Fahmida Rahman
(74) *Attorney, Agent, or Firm* — Isidore PLLC

(57) ABSTRACT

An information handling system (IHS), power operation controller and method provide for execution of delegated processes in a cluster without inadvertent interruption due to a power operation of the IHS. The power operation controller of the IHS has a processing subsystem that is communicatively coupled to a network interface and a memory containing a power operation utility. The processing subsystem executes, via the network interface, a delegated process on a network resource. The processing subsystem executes the power operation utility to cause the IHS to determine whether a request for a power operation of the IHS is received. In response to determining that a power operation is received, the processing subsystem transfers the delegated process to another network resource. In addition, during a transference of the delegated process, the processing subsystem prevents the IHS from performing a power operation of the IHS that would cause interruption of the delegated process.

20 Claims, 7 Drawing Sheets

(51) Int. Cl.
*G06F 9/455* (2018.01)
*G06F 9/4401* (2018.01)

(56) References Cited

U.S. PATENT DOCUMENTS

| | | | |
|---|---|---|---|
| 7,822,719 | B1 | 10/2010 | Noveck |
| 7,840,730 | B2 | 11/2010 | D'Amato et al. |
| 7,886,065 | B1 | 2/2011 | Satish et al. |
| 8,033,913 | B2 | 10/2011 | Cockerille et al. |
| 8,234,486 | B2 | 7/2012 | Bernardini et al. |
| 8,463,762 | B2 | 6/2013 | Petter et al. |
| 9,058,123 | B2 | 6/2015 | Joshi et al. |
| 9,130,824 | B2 | 9/2015 | Bhatia et al. |
| 9,348,646 | B1 | 5/2016 | Daya et al. |
| 9,400,611 | B1 | 7/2016 | Raizen |
| 9,489,274 | B2 | 11/2016 | Kondalsamy et al. |
| 9,684,460 | B1 | 6/2017 | Colgrove et al. |
| 9,740,551 | B2 | 8/2017 | Desai et al. |
| 9,791,908 | B2 * | 10/2017 | Grehan .................. G06F 1/30 |
| 9,912,535 | B2 | 3/2018 | Ayanam et al. |
| 10,033,803 | B1 * | 7/2018 | Collins .................. H04L 69/40 |
| 2009/0125901 | A1 | 5/2009 | Swanson |
| 2012/0036383 | A1 * | 2/2012 | Iwata .................. G06F 1/3203 |
| | | | 713/324 |
| 2012/0297181 | A1 | 11/2012 | Lee |
| 2014/0068197 | A1 | 3/2014 | Joshi et al. |
| 2014/0245078 | A1 | 8/2014 | Vichare et al. |
| 2017/0220362 | A1 | 8/2017 | Jenne et al. |
| 2018/0095832 | A1 | 4/2018 | Pillilli et al. |
| 2018/0253131 | A1 * | 9/2018 | Heinrich ............ G06F 11/1004 |

OTHER PUBLICATIONS

VMWARE "vSphere Availability," Apr. 17, 2018 copyright 2009-2018 VMware, Retrieved from the Internet URL: https://docs/vmware.com/en/VMware-vSphere/6.7/vsphere-esxi-vcenter-server-7-availability-guide.pdf> entire document.

* cited by examiner

MANAGING POWER REQUEST DURING CLUSTER OPERATIONS

BACKGROUND

1. Technical Field

The present disclosure relates in general to controllers that manage power requests within an information handling system (IHS), and more particularly to transferring delegated processes within a cluster of IHSs in response to a power request.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can operate in a clustered environment ("cluster"). Different nodes of the cluster can handle delegated processes for a customer system. Responsibility for managing a delegated process can be transferred from a currently responsible node to another node when the currently responsible node needs to power down or reboot. Clustered environments provide redundancy of nodes as an attempted guarantee that the services present in the virtual machines are available, even during a hardware failure. If a customer inadvertently reboots a server that is part of a cluster, such as through host or baseboard management controller (BMC), the host does not have an opportunity to perform a "VM move operation" (i.e., move or transfer all the VMs out of the server) prior to shutdown. Hence all the VMs will move to critical state since a VM Move operation cannot be executed within the time reboot is executed by an operating system (OS) of the host. As a result, all the VMs and the services on the VMs will move to critical state and will not be available to users, compromising the required high availability (HA) requirement for the cluster. Mere redundancy of nodes is an insufficient guarantee of availability.

Another HA requirement of a delegated process handled by a cluster is file storage on a cluster shared volume. When files are in the process of being modified from cluster shared volumes, a reboot of a server responsible for a particular cluster shared volume could leave the file in a corrupted state. Specifically, when the system reboots as an application is trying to perform file operations (closing or opening a file), at most scenarios, the reboots could cause a file to become zero size.

Clustered environments are often implemented for users that require high storage capacity and secure data redundancy. Banks are an example of such users that frequently carry out migration activity of files. The migration activity can utilize network paths such as network file system (NFS), common internet file system (CIFS), and internet small computer systems interface (iSCSI) server paths that are configured without multipath. Multipathing is a technique of having more than one physical path that transfers data between host and an external storage device. Migration activity can continue along a different path in the event of a failure of a device along one physical path. Clusters having network paths without multipath are still used to migrate or mirror the data for activity like data replication or migration. The complexity and thus cost of such a network path is reduced. However, the migration activity will result in failure if the server receives any reboot request during the data replication or migration.

BRIEF SUMMARY

In accordance with the teachings of the present disclosure, a method of handling power requests during cluster operations avoids inadvertent interruptions of delegated processes due to a power operation of an information handling system (IHS). In one or more embodiments, the method includes executing a delegated process on a network resource by a first controller of the IHS. The method includes determining, by the first controller of the IHS, whether a request for a power operation of the IHS is received. In response to determining that the power operation request is received, the method includes: (i) transferring the delegated process to another network resource; and (ii) preventing the IHS from performing a power operation of the IHS during a transference of the delegated process.

In accordance with the teachings of the present disclosure, an IHS includes a network interface coupled to a network. The IHS includes a first controller communicatively coupled, via the network interface, to a network resource that executes a delegated process. A power operation utility, when executed by the first controller, enables the IHS to determine whether request for a power operation of the IHS is received. In response to determining that a request for a power operation is received, the power operation controller enables the IHS to: (i) transfer the delegated process to another network resource; and (ii) prevent the IHS from performing a power operation of the IHS during a transference of the delegated process.

In accordance with the teachings of the present disclosure, a power operation controller handles power operation requests during cluster operations to avoid inadvertent interruptions of delegated processes. The power operation controller includes a network interface coupled to a network. A memory contains a power operation utility. A processing subsystem is communicatively coupled to the network interface and the memory. The processing subsystem executes, via the network interface, a delegated process on a network resource. The processing subsystem executes the power operation utility to cause the IHS to determine whether a request for a power operation of the IHS is received. In response to determining that a request for a power operation is received, the IHS transfers the delegated process to another network resource. The processing subsystem prevents the IHS from performing a power operation of the IHS during a transference of the delegated process.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

An information handling system (IHS), a power operation controller, and a method provide for execution of delegated processes in a clustered environment or cluster without inadvertent interruption due to a power operation of the IHS. The power operation can entail a powering down or a soft reboot or similar change that prevents normal operation of the IHS. The power operation controller of the IHS has a processing subsystem that is communicatively coupled to a network interface and a memory containing a power operation utility. The processing subsystem executes, via the network interface, a delegated process on a network resource. The processing subsystem executes the power operation utility to cause the IHS to determine whether a request for a power operation of the IHS is received. In response to determining that a request for a power operation is received, the processing subsystem transfers the delegated process to another network resource. In addition, during a transference of the delegated process, the processing sub-system prevents the IHS from performing a power operation of the IHS that would cause interruption of the delegated process.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
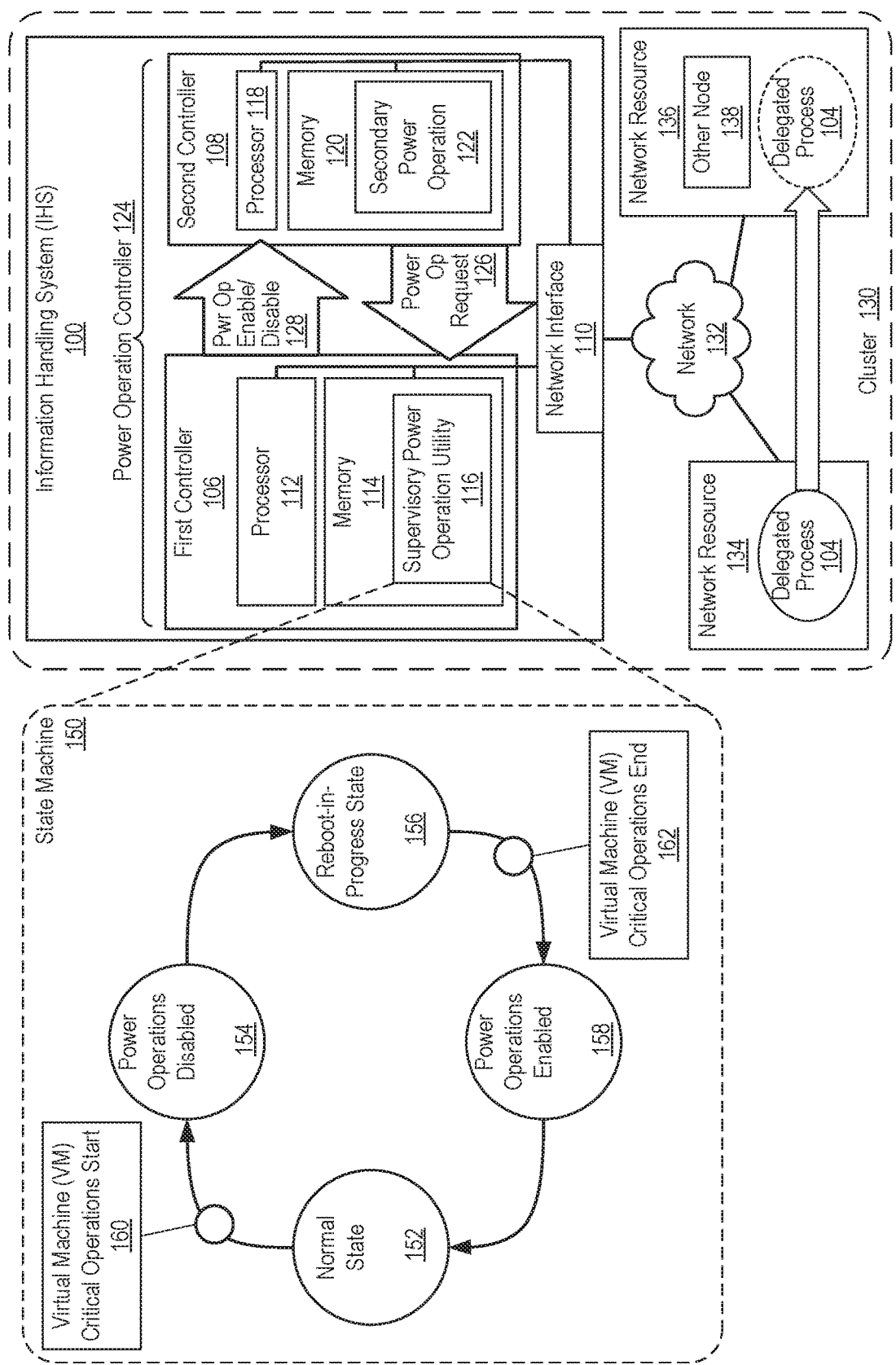
FIG. 1 is a simplified functional block diagram illustrating an information handling system (IHS) that handles power operation requests during cluster operations to avoid loss of delegated processes, according to one or more embodiments.

FIG. 1 is a simplified functional block diagram illustrating an information handling system (IHS) 100 that handles power operation requests according to a state machine during cluster operations to avoid loss of delegated process(es) 104. Within the general context of IHSs, IHS 100 may include any instrumentality or an aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS 100 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS 100 includes first controller 106, second controller 108, and a network interface 110. First controller 106 includes processor 112 that is communicatively coupled to network interface 110 and to memory 114, which contains supervisory power operation utility 116. Second controller 108 includes processor 118 that is communicatively coupled to network interface 110 and to memory 120 containing secondary power operation utility 122. First controller 106 and second controller 108 can be a distributed processing subsystem functioning as a power operation controller 124 of the IHS 100. Power operation controller 124 begins transference of delegated process(es) 104 to another IHS in preparation for a power operation such as reboot and shutdown. Power operation controller 124 prevents a power operation or implementation of a new delegated process during the transference of delegated process(es) 104. Secondary power operation utility 122, when executed by processor 118, can enable second controller 108 to generate power operation request 126 to first controller 106. Supervisory power operation utility 116, when executed by processor 112, can enable first controller 106 to communicate a power operation enable or disable command 128 to second controller 108.

IHS 100 is a node within cluster 130. First controller 106 is communicatively coupled, via network interface 110 and network 132, to network resource 134. Network resource 134 executes delegated process(es) 104. First controller 106 determines whether a power operation of IHS 100 is required. A power operation can be triggered by power operation request 126 from second controller 108. In response to determining that a request for a power operation is received, first controller 106 transfers delegated process(es) 104 to another network resource 136 that is managed by another node 138. During a transference of the delegated process(es) 104, first controller 106 prevents any controller including second controller 108 of IHS 100 from performing a power operation of IHS 100 or implementing a new delegated process that is to be managed by IHS 100.

Power operation controller 124 operates according to state machine 150 that moves from a normal state 152 to power operations disabled state 154, and then to reboot-in-progress state 156, then to power operations enabled state 158, and then returning to normal state 152. Power operations are allowed in normal state 152. Power operation controller 124 determines whether VM critical operations start condition 154 is present. In response to determining VM critical operations start condition 160 is present, power operation controller 124 enforces power operations disabled state 154 on IHS 100. With power operations disabled, power operation controller 124 causes IHS 100 to enter reboot-in-progress state 156 to prepare for reboot without interruption of delegated process(es) 104. Power operation controller 124 determines whether VM critical operations end condition 162 is present. In response to determining that VM critical operations end condition 162 is present, power operation controller 124 causes IHS 100 to enter a power operations enabled state 158 to re-enable IHS 100 to perform power operations. Then power operation controller 124 causes IHS 100 to return to normal state 152 that allows reboot.

In one or more embodiments, first controller 106 is a host processor subsystem ("host") and second controller 108 is a baseboard management controller (BMC). As presented herein, BMC is a specialized service processor that monitors the physical state of a computer, network server, or other hardware device using sensors. BMC communicates with the system administrator through an out-of-band connection that is independent of the in-band connection used for cluster operations.

Figure 2:
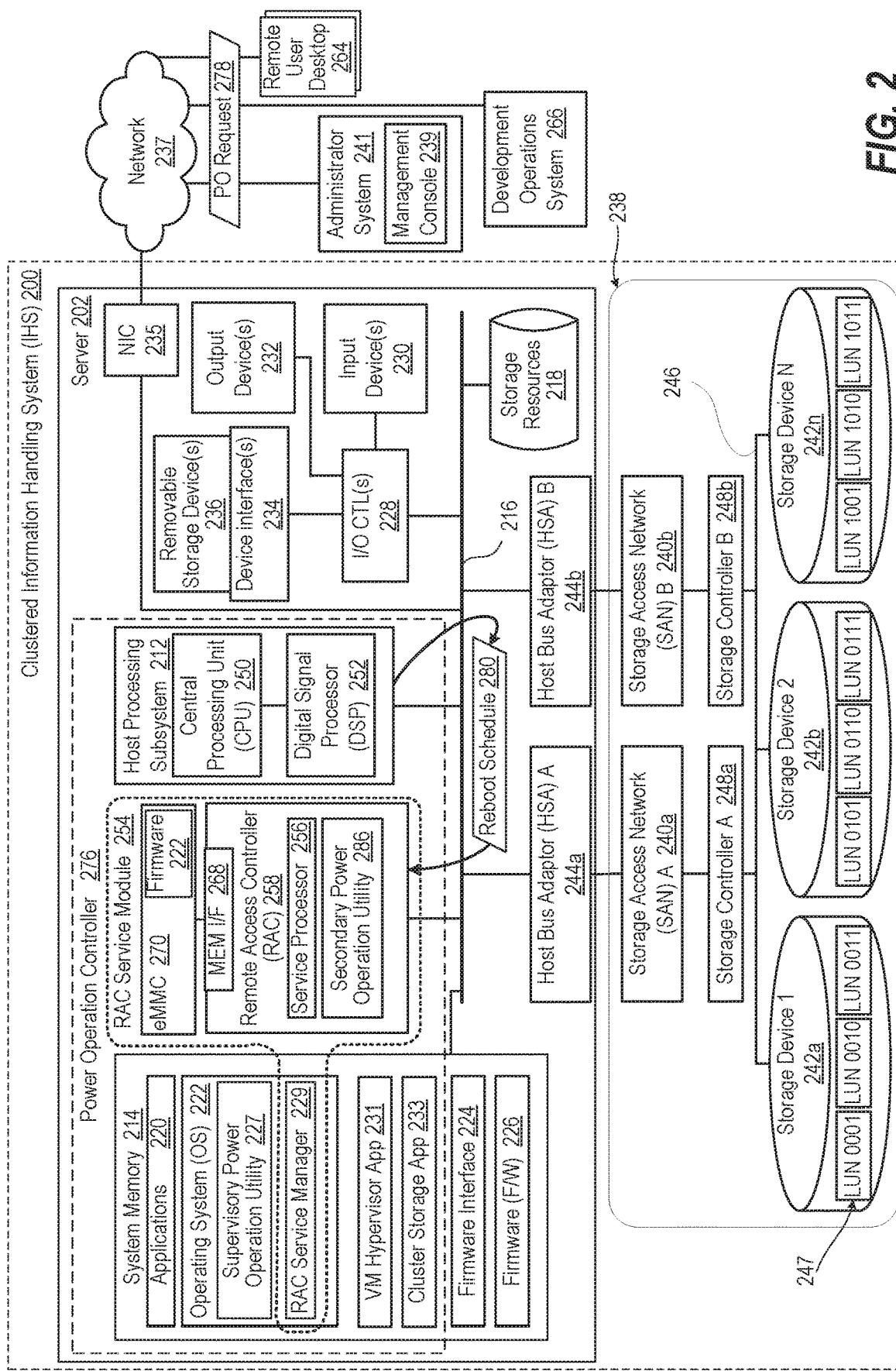
FIG. 2 illustrates a block diagram representation of an example clustered IHS having a server that handles power operation requests during transfer of delegated processes, according to one or more embodiments.

FIG. 2 illustrates a block diagram representation of an example cluster IHS 200 having server 202 that handles power operation requests during transfer of delegated process(es) 104 (FIG. 1). Cluster IHS 200 is an example implementation of IHS 100 (FIG. 1). System interconnect 216 can be interchangeably referred to as a system bus, in one or more embodiments. System interconnect 216 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 216 can also be a Double Data Rate (DDR) memory interface. The system memory 214 can either be contained on separate removable dual inline memory module (RDIMM) devices or system memory 214 can be contained within persistent memory devices (NVDIMMs). For example, the NVDIMM-N variety of NVDIMMs contain both random access memory, which can serve as system memory, and non-volatile memory. It should be noted that other channels of communication can be contained within system interconnect 216, including but not limited to i2c or system management bus (SMBus). System interconnect 216 communicatively couples various system components including, for example, replaceable local storage resources 218 such as solid state drives (SDDs) and hard disk drives (HDDs) within which can be stored on one or more software and/or firmware modules and one or more sets of data. Local storage resources 218 can be utilized during operations of cluster IHS 200. Specifically, in one embodiment, system memory 214 can include therein a plurality of such modules, including one or more of application(s) 220, operating system (OS) 222, a firmware interface 224 such as basic input/output system (BIOS) or Uniform Extensible Firmware Interface (UEFI), and platform firmware (FW) 226. These software and/or firmware modules have varying functionality when their corresponding program code is executed by host processor subsystem 212 or secondary processing devices within IHS 200. For example, application(s) 220 may include a word processing application, a presentation application, and a management station application, among other applications. In one or more embodiments, OS includes supervisory power operation utility 227 and RAC service manager 229. Applications 220 further include VM hypervisor application 231 and cluster storage app 233.

IHS 200 further includes one or more input/output (I/O) controllers 228 that support connection by and processing of signals from one or more connected input device/s 230, such as a keyboard, mouse, touch screen, or microphone. I/O controllers 228 also support connection to and forwarding of output signals to one or more connected output devices 232, such as a monitor or display device or audio speaker(s). Additionally, in one or more embodiments, one or more device interfaces 234, such as an optical reader, a universal serial bus (USB), a card reader, Personal Computer Memory Card International Association (PCMCIA) slot, and/or a high-definition multimedia interface (HDMI), can be associated with IHS 200. Device interface(s) 234 can be utilized to enable data to be read from or stored to corresponding removable storage device/s 236, such as a compact disk (CD), digital video disk (DVD), flash drive, or flash memory card. In one or more embodiments, device interface(s) 234 can further include general purpose I/O interfaces such as inter-integrated circuit (I$^2$C), system management bus (SMB), and peripheral component interconnect (PCI) buses.

Server 200 includes a network interface, depicted as a network interface controller (NIC) 235, in communication, via network 237, with management console 239 of administrator system 241. NIC 235 enables IHS 200 and/or components within IHS 200 to communicate and/or interface with other devices, services, and components that are located external to IHS 200, represented as network devices, such as administrator system 241. These devices, services, and components can interface with IHS 200 via an external network, such as example network 237, using one or more communication protocols that include transport control protocol/internet protocol (TCP/IP) and network block device (NBD) protocol. Network 237 can be a local area network, wide area network, personal area network, and the like, and the connection to and/or between network and IHS 200 can be wired, wireless, or a combination thereof. For purposes of discussion, network 237 is indicated as a single collective component for simplicity. However, it should be appreciated that network 237 can comprise one or more direct connections to other devices as well as a more complex set of interconnections as can exist within a local area network or a wide area network, such as the Internet.

Remote and highly available storage is provided by a storage system 238 that includes storage area networks (SANs) 240a, 240b. Each SAN 240a, 240b is a high-speed network of shared storage systems, depicted as storage devices 242a, 242b, 242n. SANs 240a, 240b may be used to provide centralized data sharing, data backup, and storage management. SAN 240a, 240b may include multiple servers and multiple storage systems. For clarity, server 202 is presented as a single server having two host bus adapters (HBAs) 244a, 244b coupled to single storage system 238 having storage devices 242a, 242b, 242n. Server 202 and storage system 238 are coupled to one another across a switching network 246. Switching network 246 is coupled to server 202 through the HBAs 244a, 244b. The storage units or logical unit numbers (LUNs) 247 of the storage system 238 are accessed through the ports and storage controllers 248a, 248b of the storage system 238.

Host processor subsystem 212 can include at least one central processing unit (CPU) 250. In the illustrative embodiment, CPU 250 is augmented by a digital signal processor (DSP) 252. Host processor subsystem 212 interfaces to functional components of IHS 200 such as remote access controller (RAC) service module 254. RAC service module 254 includes a specialized service processor 256 of RAC 258 that performs BMC functionality. For example, RAC 258 monitors the physical state of a computer, network server or other hardware device, such as server 202, using sensors. RAC 258 communicates with a system administrator through an independent connection, such as NIC 235. As a non-limiting example, RAC 258 can be an improved integrated Dell® Remote Access Controller (iDRAC) that supports power operation functionality described herein. The iDRAC also has the ability to see OS specific files. RAC 258 performs out-of-band communication for the IHS 200 via the NIC 235 and network 237 with a network device, such as management console 260 associated with administrator system 262. Network device can also be remote user desktop 264 or development operations system 266. When RAC 258 operates as BMC, RAC 258 coordinates host file operations on network shared logical unit (LUN) 247 and host power operation requests. Host processor subsystem 212 communicates to the RAC 258 whenever OS 222 starts any critical file operations on shared LUN 247. Reboot requests received by either host processor subsystem 212 or RAC 258 are ignored or held in wait/hold state during the critical file operation.

RAC 258 can have access, via memory interface (I/F) 268, to a persistent storage device of RAC service module 254, such as an embedded multimedia card (eMMC) 270, which is local memory. To interface with host processor subsystem 212, RAC service module 254 includes a software component, RAC service manager 229, that is separate from RAC 258 and contained in system memory 214 and executed by the host processor subsystem 212.

Power operation controller 276 is provided by host processor subsystem 212 and RAC service module 254. Power operation controller 276 handles power operation requests 278 without interrupting delegated processes. RAC 258 can receive power operation requests 278 that arise intentionally or inadvertently from any one of management console 260 on administrator system 262, remote user desktop 264, and development operations system 266. Host processor subsystem 212 can receive power operation requests 278 from VM hypervisor application 231 or cluster storage application 233 in system memory 214. VM hypervisor application 231 or cluster storage application 233 can detect a problem with network resources such as storage system 238. Host processor subsystem 212 executes supervisory power operations utility 227 in coordination with secondary power operation utility 286 executed by RAC 258. Power operation controller 276 determines whether a power operation request is received from a customer system, such as from management console 260 on administrator system 262, from remote user desktop 264, or from development operations system 266. In response to determining that the power operation request is received from the customer system, RAC 258 communicates the power operation request with host processor subsystem 212 via the RAC service manager 229 to prompt transfer of the delegated process by host processor subsystem 212. Host processor subsystem 212 schedules the request power operation such as a reboot to occur after transference of delegated process(es) 104 (FIG. 1). RAC 258 receives reboot schedule 280 from host processor subsystem 212. RAC 258 ignores any new power operation requests or new delegated process requests prior to execution of the scheduled power operation by host processor subsystem 212.

Figure 3:
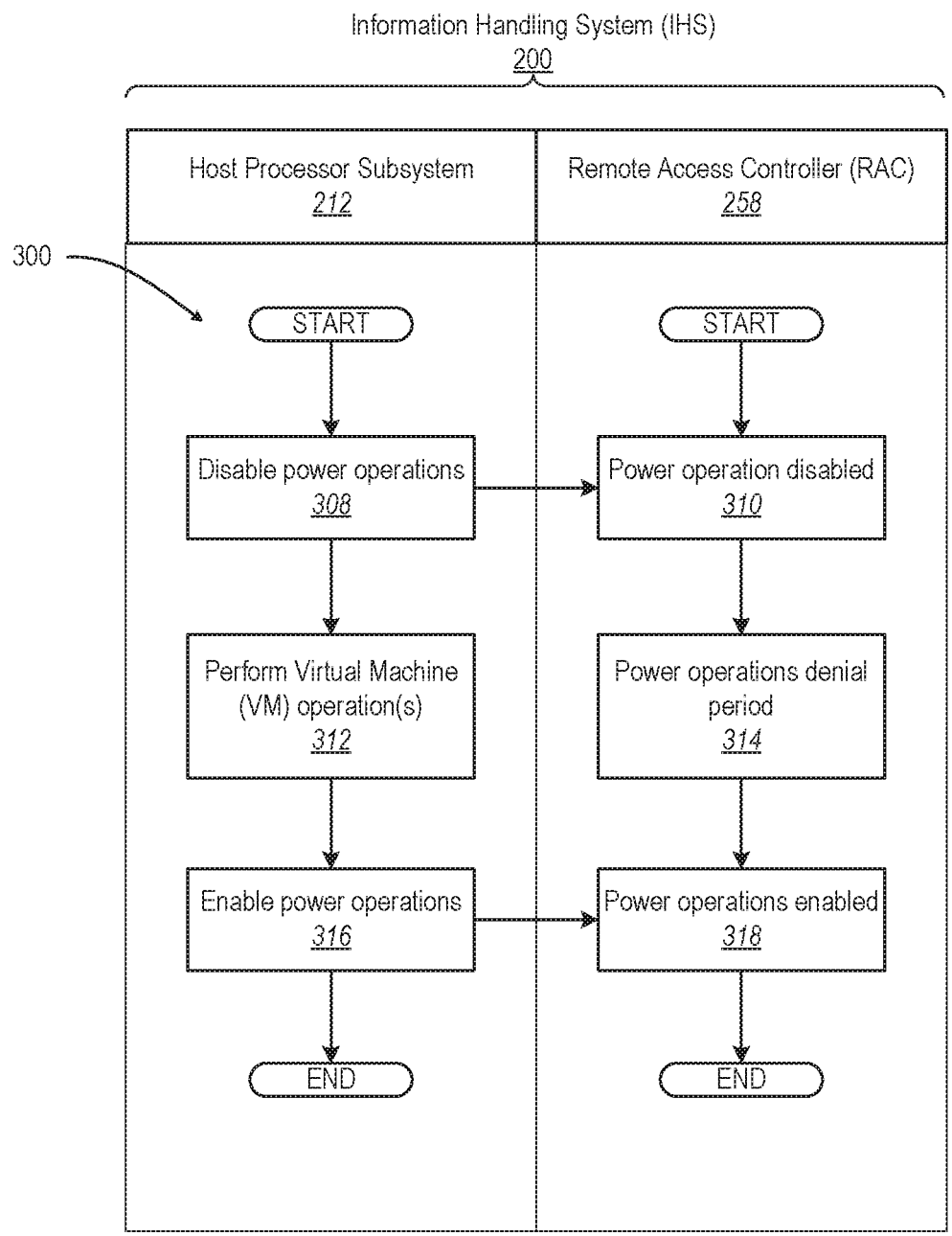
FIG. 3 is a process flow diagram illustrating a coordinated procedure of handling reboot/power down requests during cluster and hypervisor operations, according to one or more embodiments.

FIG. 3 is a process flow diagram illustrating a coordinated procedure 300 performed by IHS 200 having host processor subsystem 212 and RAC 258 that handle reboot/power down requests during cluster operations and hypervisor operations. Within the following description of coordinated procedure 300 of IHS 200, the presented processes are representative of example processes perform by IHS 100 (FIG. 1) and/or IHS 200 (FIG. 2). Host processor subsystem 212 disables power operations for both the host processor subsystem 212 and RAC 258 (block 308). RAC 258 implements its status changed to power operation disabled in response to host processor subsystem 212 (block 310). Host processor subsystem 212 performs cluster and VM operation(s) (block 312). Concurrently, RAC 258 operates in a power operation denial period (block 314). Upon completion of VM operation(s), host processor subsystem 212 enables power operations for both host processor subsystem 212 and RAC 258 (block 316). RAC responds with its status change to power operations enabled (block 318). Then coordinated procedure 300 ends.

Figure 4A:
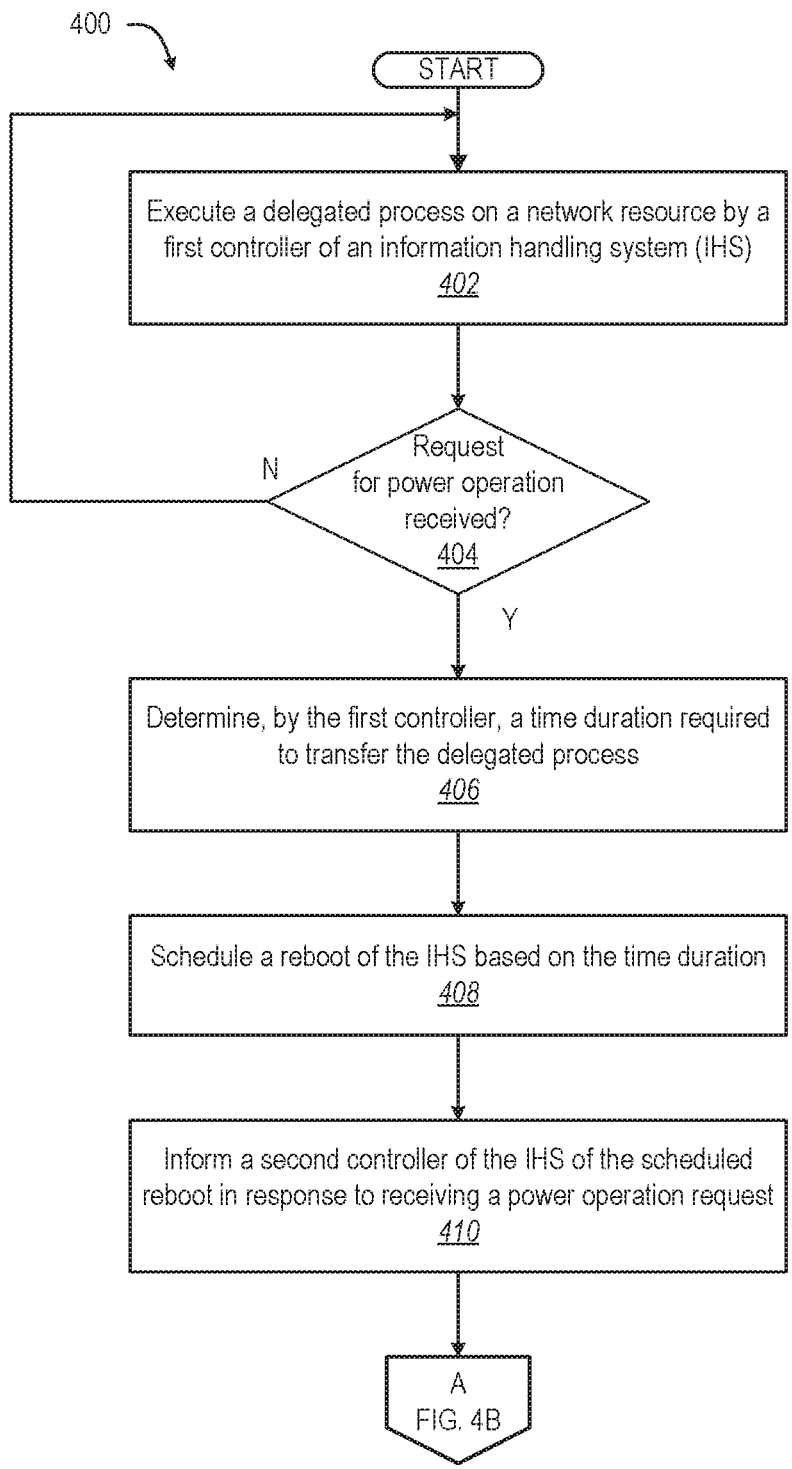
FIGS. 4A and 4B are a flow diagram illustrating a method of handling power requests during cluster operations, according to one or more embodiments.
Figure 4B:
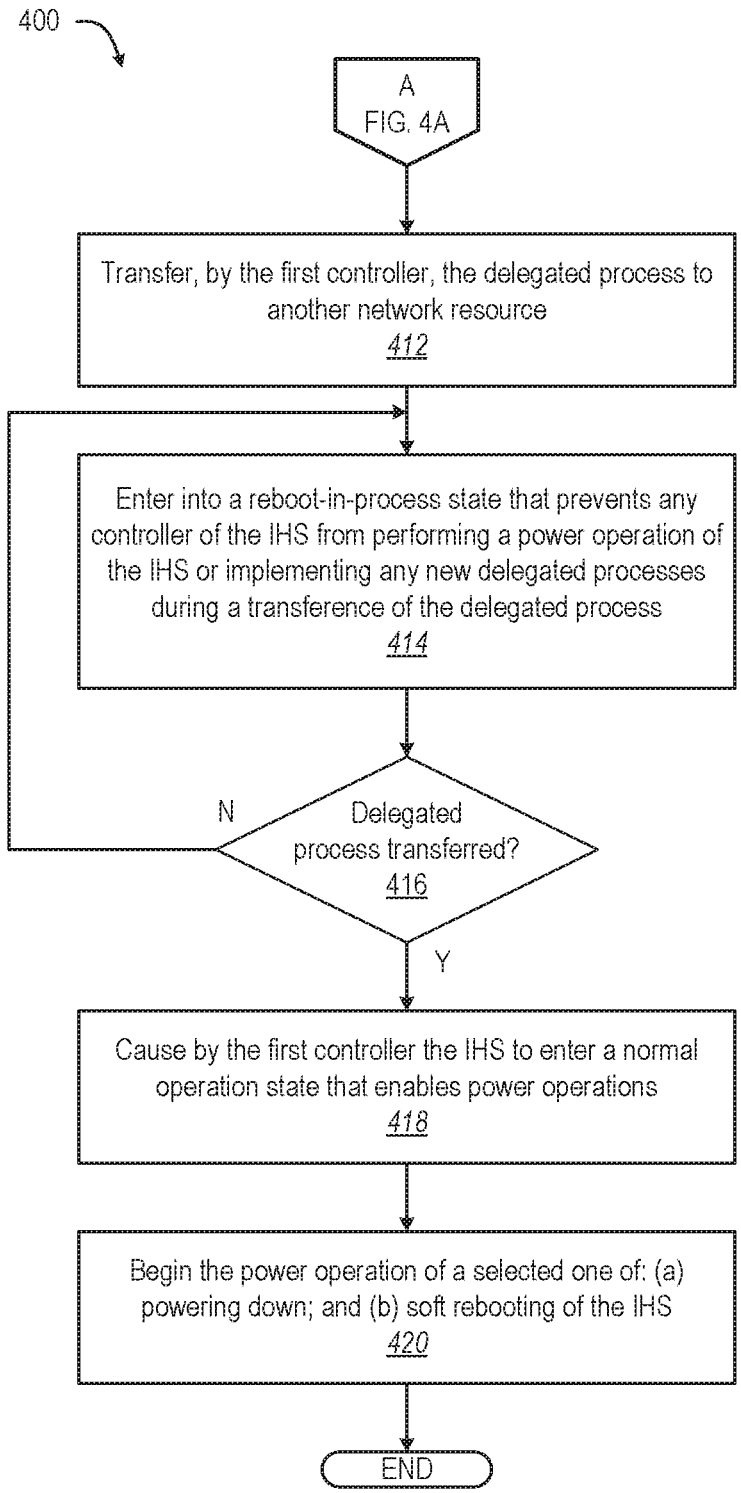

FIGS. 4A and 4B are a flow diagram illustrating method 400 for handling power requests during cluster operations. Method 400 includes executing, by first controller 106 (FIG. 1) of IHS 100, a delegated process on a network resource (block 402). In one or more embodiments, executing the delegated process includes managing a selected one or more of a virtualization machine (VM) and a clustered service for file storage. Method 400 includes determining, by the first controller of the IHS, whether a request for a power operation of the IHS is received (decision block 404). A requirement for a power operation can be triggered by receiving a request for a power operation. In some instances, the request can be inadvertently requested from remote user desktop 264 (FIG. 2). Even if inadvertent, first controller can deem the request as based on a requirement. The first controller can detect a hardware condition that requires a power operation, such as a change in operational status of memory devices. Rebooting would allow built-in test and mapping of available local memory devices. The first controller can receive a power operation request that originated from development operations system 266 (FIG. 2) to make a firmware update operational. In response to determining that a power operation is not received, method 400 returns to block 402 to continue executing the delegated process. In response to determining that a request for a power operation is received, method 400 includes determining, by the first controller, a time duration required to transfer the delegated process (block 406). Method 400 includes scheduling a reboot of the IHS based on the time duration (block 408). First controller informs a second controller of the IHS of the scheduled reboot, (block 410). In one or more embodiments, host processor subsystem 212 (FIG. 2) operates as first controller 106 (FIG. 1) and reboots in response to the power operation. Second controller 108 (FIG. 1) can be a remote access controller (RAC) 254 (FIG. 2) that is enabled to cause the power operation of the host processor subsystem. Method 400 includes transferring, by the first controller, the delegated process to another network resource (block 412). Method 400 includes first controller asserting a reboot-in-process state that prevents any controller of the IHS from performing a power operation of the IHS or implementing any new delegated processes during a transference of the delegated process (block 414). Method 400 includes determining whether the delegated process has completed transference to the other processor subsystem (decision block 416). In response to determining that the delegated process has not completed transference, method 400 returns to block 414 to maintain the reboot-in-process state. In response to determining that the delegated process has completed transference, method 400 includes first controller causing the IHS to enter a normal operation state that enables power operations by at least the first controller (block 418). In one or more embodiments, method 400 includes beginning the power operation of a selected one of: (a) powering down; and (b) soft rebooting of the IHS (block 420). Then method 400 ends.

Figure 5A:
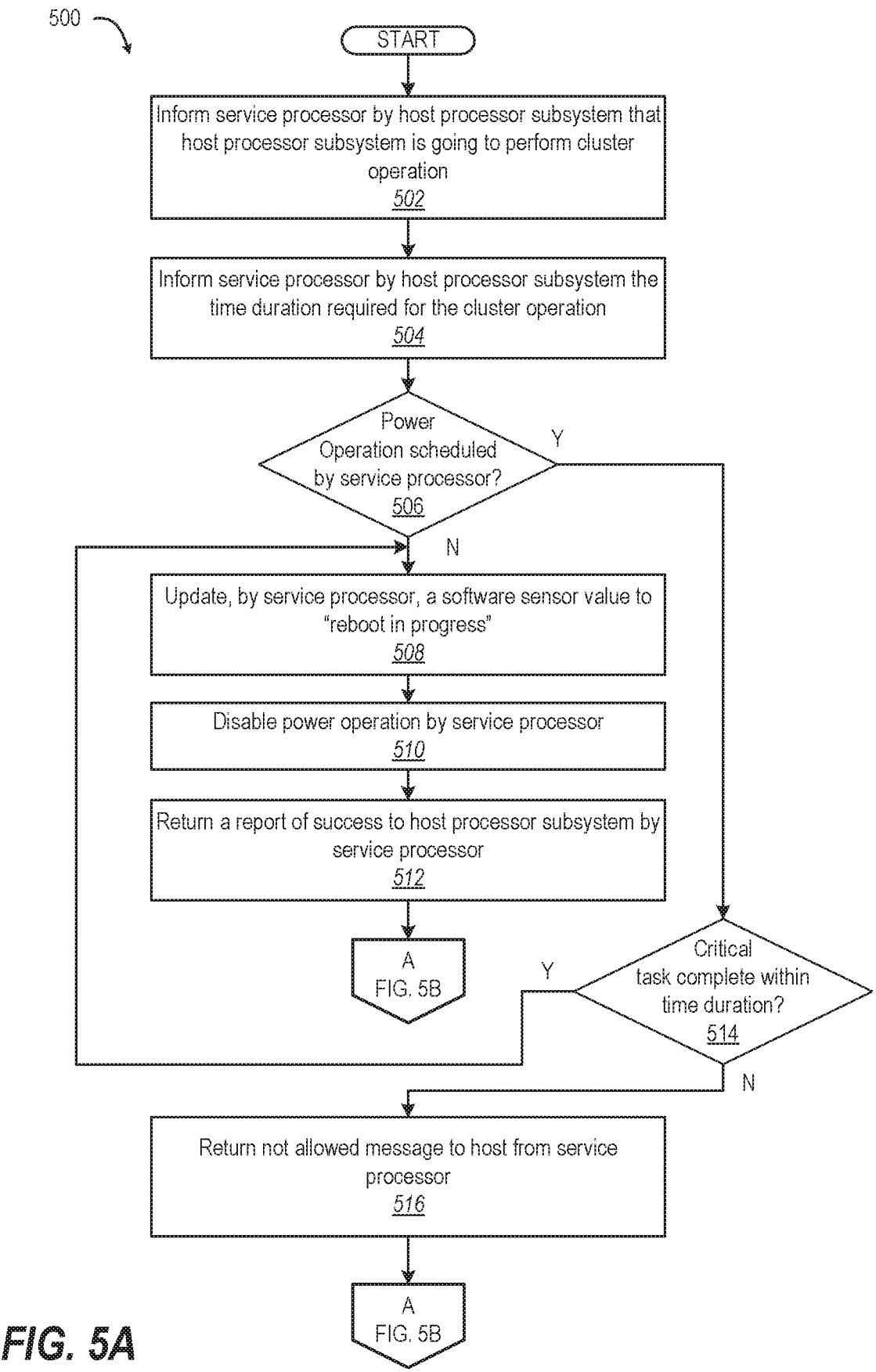
FIGS. 5A and 5B are a flow diagram illustrating an example method for handling reboot or power down requests during cluster operations and hypervisor operations, according to one or more embodiments.
Figure 5B:
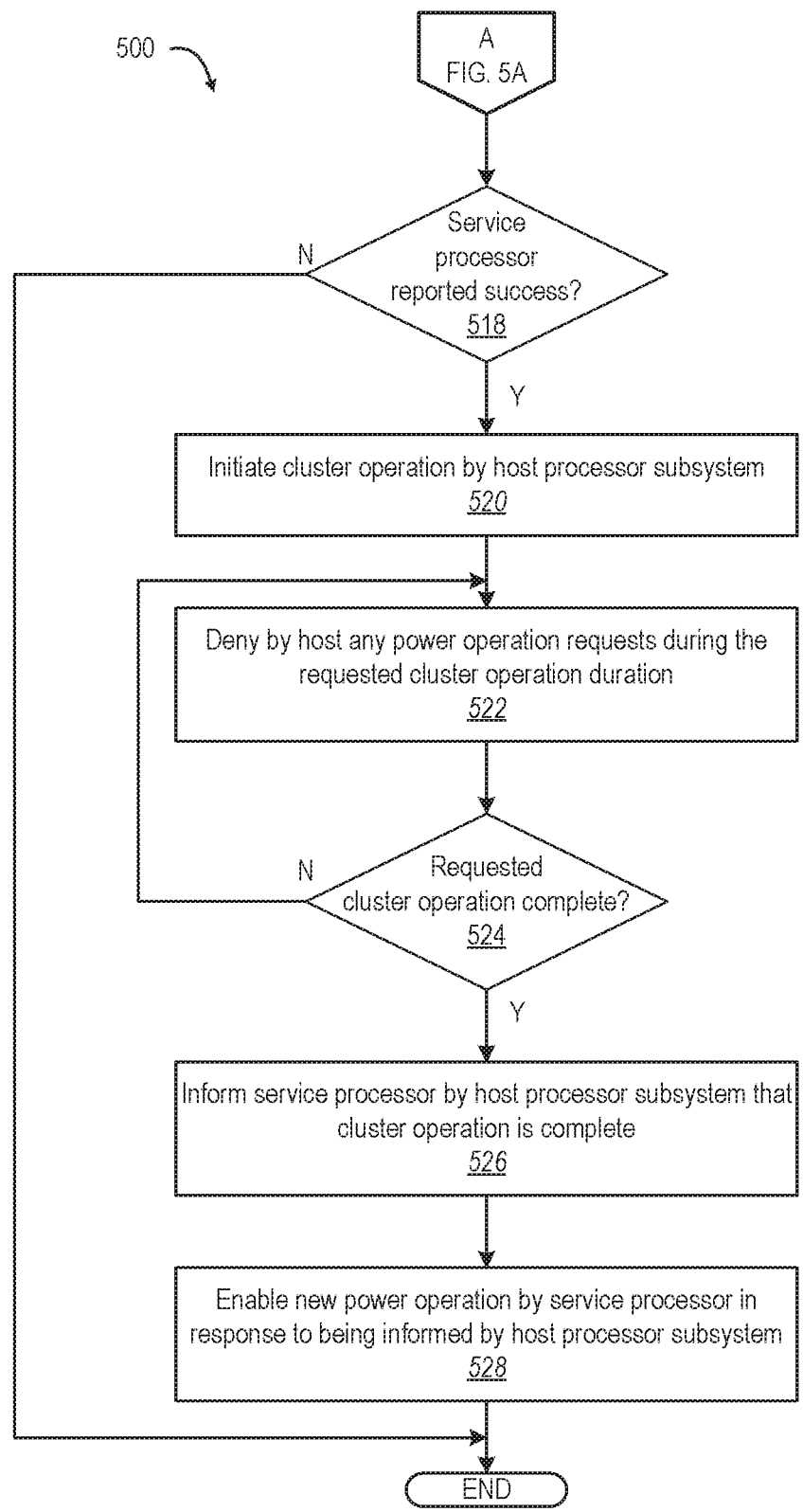

FIGS. 5A and 5B are a flow diagram illustrating an example method 500 for handling reboot or power down requests during cluster operations and hypervisor operations by IHS 200 (FIG. 2). In one or more embodiments, method 500 is performed at least in part by host processor subsystem 212 of IHS 200 (FIG. 2). Method 500 is performed at least in part by a BMC, such as service processor 256 of RAC 258 (FIG. 2). In one or more embodiments, method 500 provides for power operations that are scheduled and handled by service processor during a normal operation state. Host processor subsystem (also referred to herein as "host") may need to perform other critical operations that could be affected by a power operation by service processor, but the critical operation itself may not necessarily be transference of a delegated process in response to a request for a power operation. Host processor subsystem may not be able to unilaterally cancel a currently scheduled power operation executed by service processor.

Method 500 includes host processor subsystem informing service processor that host processor subsystem is going to perform cluster operation (block 502). Method 500 includes host processor subsystem informing service processor the time duration required to complete the cluster operation (block 504). Method 500 includes determining by service processor whether power operation is already scheduled (decision block 506). In response to determining that power operation is not already scheduled, method 500 includes updating, by service processor, a software sensor value to "reboot in progress" (block 508). "Reboot in progress" value indicates not only the actual reboot of IHS but also preparations made to avoid loss of delegated processes that are being handled by IHS, including computing and file storage actions. Method 500 includes disabling power operation by service processor (block 510). Method 500 includes returning, by service processor, a report of success to host that performing the cluster operation will not be affected by an already scheduled power operation (block 512). In response to determining that power operation is already scheduled, method 500 includes determining whether an estimated time of completion of a critical task by service processor is within the time duration of the cluster operation by host (decision block 514). In response to determining that the critical task will not complete, method 500 includes returning not allowed message to host from service processor (block 516). In response to determining that the critical task will complete, method 500 includes returning to block 506, which ultimately leads to reporting success to host in block 512.

Method 500 includes determining, by host, whether service processor reported success (decision block 518). In response to determining that service processor reported success, method 500 includes initiating cluster operation by host (block 520). Method 500 includes denying, by host processor subsystem, any power operation requests during the requested cluster operation duration (block 522). Method 500 includes determining, by the host processor subsystem, whether the requested cluster operation is complete (decision block 524). In response to determining that the requested cluster operation is not complete, method 500 includes returning to block 522. In response to determining that the requested cluster operation is complete, method 500 includes informing service processor, by host processor subsystem, that cluster operation is complete (block 526). Method 500 includes enabling new power operation by service processor in response to being informed by host processor subsystem that the cluster operation is complete, allowing any power operation requests that were ignored or deferred by service processor during the reboot in progress state to occur (block 528). Then method 500 ends. In response to determining that service processor did not report success in decision block 518, method 500 ends.

In the above described flow charts of FIGS. 4A, 4B, 5A and 4B one or more of the methods may be embodied in controller(s) 106, 108, 124 (FIG. 1) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of handling power requests during cluster operations, the method comprising:
executing a delegated process on a network resource by a first controller of an information handling system (IHS) that is a node within a cluster of IHSs, the IHS having the first controller and a second controller;
determining, by the first controller of the IHS, that a request for a power operation of the IHS is received; and
in response to determining that the request for the power operation is received:
transferring the delegated process to another network resource managed by another node in the cluster;
scheduling the power operation using the second controller of the IHS, based on transference of the delegated process; and
preventing, during the transference of the delegated process, the IHS from (i) performing a power operation of the IHS and (ii) implementing of a new delegated process, the preventing comprising: disabling power operations for both the first controller and the second controller; ignoring any new power operation requests and any new delegated process requests prior to execution of the scheduled power operation by the first controller; and re-enabling power operations for both the first controller and the second controller on completion of the transferring of the delegated process.

2. The method of claim 1, wherein executing the delegated process comprises supporting a selected one of a virtualization machine (VM) and a clustered service.

3. The method of the claim 1, wherein transferring the delegated process comprises entering a reboot-in-process state that prevents both: (i) starting new delegated processes; and (ii) implementing the power operation.

4. The method of claim 1, further comprising:
determining whether the delegated process has completed transference to another processing subsystem; and
in response to determining that the delegated process has completed transference:
entering a normal operation state that enables power operations by at least the first controller, the power operations begin a selected one of: (a) powering down; and (b) soft rebooting of the IHS.

5. The method of claim 1, further comprising:
determining a time duration required to transfer the delegated process;
scheduling a reboot of the IHS based on the time duration; and
informing the second controller of the IHS of the scheduled reboot in response to receiving a power operation request.

6. The method of claim 5, wherein:
the first controller comprises a host processor subsystem that reboots the IHS in response to the power operation only after completion of the transfer of the delegated process; and
the second controller comprises a remote access controller (RAC) that is enabled to cause the power operation of the host processor subsystem.

7. The method of claim 1, further comprising:
generating, by the second controller, a power operation request to the first controller; and
communicating, by the first controller, a power operation enable or disable command to the second controller in response to receiving the power operation request and based on a current status of whether the first controller is processing the delegated process.

8. An information handling system (IHS) in a cluster of IHSs, the IHS comprising:
a network interface coupled to a network;
a first controller communicatively coupled, via the network interface, to a network resource that executes a delegated process;
a second controller communicatively coupled to the first controller and to the network interface, the second controller being configured to communicate a power operation request to the first controller;
a power operation utility that, when executed by the first controller, enables the IHS to:
determine that a request for a power operation of the IHS is received; and
in response to determining that the request for the power operation is received:
transfer the delegated process to another network resource managed by another node in the cluster;
schedule the power operation based on transference of the delegated process; and
prevent, during the transference of the delegated process, the IHS from (i) performing a power operation of the IHS and (ii) implementing of a new delegated process, wherein to prevent the performing and the implementing the IHS: disables power operations for both the first controller and the second controller; ignores any new power operation requests and any new delegated process requests prior to execution of the scheduled power operation by the first controller; and re-enables power operations for both the first controller and the second controller on completion of the transfer.

9. The IHS of claim 8, wherein executing the delegated process comprises a selected one of a virtualization machine (VM) and a clustered service.

10. The IHS of claim 8, wherein the first controller enables the IHS to enter a reboot-in-process state during transfer of the delegated process that prevents both: (i) starting new delegated processes; and (ii) implementing the power operation.

11. The IHS of claim 8, wherein the first controller enables the IHS to:
determine whether the delegated process has completed the transference to another processing subsystem; and
in response to determining that the delegated process has completed the transference, enter a normal operation state that enables power operations by at least the first controller, the power operations begin a selected one of: (a) powering down; and (b) soft rebooting of the IHS.

12. The IHS of claim 8, further comprising the second controller that is enabled to cause the power operation of the IHS, wherein the first controller enables the IHS to:
determine a time duration required to transfer the delegated process;
schedule a reboot of the first controller based on the time duration; and
inform the second controller of the IHS of the scheduled reboot in response to receiving a power operation request.

13. The IHS of claim 12, wherein:
the first controller comprises a host processor subsystem that reboots the IHS in response to the power operation only after completion of the transfer of the delegated process; and the second controller comprises a remote access controller (RAC) that is enabled to cause the power operation of the host processor subsystem.

14. A power operation controller of an information handling system (IHS) in a cluster of IHSs, the power operation controller comprising:
a network interface coupled to a network;
a memory containing a power operation utility;
a processor subsystem communicatively coupled to the network interface and the memory and that executes the power operation utility to cause the IHS to:
execute, via the network interface, a delegated process on a network resource;
determine that a request for a power operation of the IHS is received; and
in response to determining that the request for the power operation is received:
trigger a first controller to transfer the delegated process to another network resource managed by another node in the cluster;
schedule the power operation using a second controller of the IHS, based on transference of the delegated process; and
prevent, during the transference of the delegated process, the IHS from (i) performing a power operation of the IHS and (ii) implementing of a new delegated process, wherein to prevent the performing and the implementing, the power operation controller: disables power operations for both the first controller and the second controller; ignores any new power operation requests and any new delegated process requests prior to execution of the scheduled power operation; and re-enables power operations for both the first controller and the second controller on completion of the transfer.

15. The power operation controller of claim 14, wherein executing the delegated process comprises a selected one of a virtualization machine (VM) and a clustered service.

16. The power operation controller of claim 14, wherein the processor subsystem enables the IHS to enter a reboot-in-process state during transfer of the delegated process that prevents both: (i) starting new delegated processes; and (ii) implementing the power operation.

17. The power operation controller of claim 14, wherein the processor subsystem enables the IHS to:
determine whether the delegated process has completed the transference to another processing subsystem; and
in response to determining that the delegated process has completed the transference, enter a normal operation state that enables power operations by at least the processor subsystem, the power operations begin a selected one of: (a) powering down; and (b) soft rebooting of the IHS.

18. The power operation controller of claim 14, wherein the processor subsystem comprises:
the first controller that executes the delegated process; and
the second controller that is enabled to cause the power operation of the IHS, wherein the first controller enables the IHS to:
determine a time duration required to transfer the delegated process;
schedule a reboot of the first controller based on the time duration; and
inform the second controller of the IHS of the scheduled reboot in response to receiving a power operation request.

19. The power operation controller of claim 18, wherein:
the first controller comprises a host processing subsystem that reboots the IHS in response to the power operation only after completion of the transfer of the delegated process; and
the second controller comprises a remote access controller (RAC) that is enabled to cause the power operation of the host processing subsystem.

20. The power operation controller of claim 19, wherein the processor subsystem comprises:
system memory that is used by the host processing subsystem; and
a RAC service manager contained in the system memory and executed by the host processor subsystem to communicatively couple to the RAC, wherein the RAC is communicatively coupled, via the network interface, to a customer system and enables the IHS to:
determine whether a power operation request is received from the customer system; and
in response to determining that the power operation request is received from the customer system:
communicate the power operation request with the host processor subsystem via the RAC service manager to prompt transfer of the delegated process by the host processor subsystem;
receive a reboot schedule from the host processor subsystem; and
ignore any power operation requests and any new delegated process requests prior to execution of the power operation by the host processor subsystem.

\* \* \* \* \*